United States Patent
Ingle et al.

(10) Patent No.: US 11,093,230 B2
(45) Date of Patent: *Aug. 17, 2021

(54) CONSISTENT OPERATING SYSTEM SERVICING FOR DISTRIBUTED NODES

(71) Applicant: MICROSOFT TECHNOLOGY LICENSING, LLC, Redmond, WA (US)

(72) Inventors: Anil Ingle, Woodinville, WA (US); Chuck Lenzmeier, Woodinville, WA (US); Saad Syed, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 234 days.

This patent is subject to a terminal disclaimer.

(21) Appl. No.: 14/942,827

(22) Filed: Nov. 16, 2015

(65) Prior Publication Data
US 2016/0070563 A1    Mar. 10, 2016

Related U.S. Application Data

(63) Continuation of application No. 12/360,686, filed on Jan. 27, 2009.

(51) Int. Cl.
*G06F 9/445* (2018.01)
*G06F 9/44* (2018.01)
(Continued)

(52) U.S. Cl.
CPC .............. *G06F 8/65* (2013.01); *G06F 8/63* (2013.01); *G06F 9/441* (2013.01); *H04L 67/06* (2013.01); *H04L 67/34* (2013.01)

(58) Field of Classification Search
CPC ... G06F 8/63; G06F 8/65; G06F 9/441; H04L 67/06; H04L 67/34
(Continued)

(56) References Cited

U.S. PATENT DOCUMENTS

| 7,051,088 B2 | 5/2006 | Sesek |
| 7,062,764 B2 | 6/2006 | Cohen et al. |

(Continued)

OTHER PUBLICATIONS

Mikael Nystrom, Windows Vista Image Servicing and Customization, pp. 1-27, http://download.microsoft.com/download/8/b/a/8ba3f35f-5e21-40ac-8a84-cef5f47dea75/30ServicingAndCustomization.pdf.*

(Continued)

*Primary Examiner* — Wei Y Zhen
*Assistant Examiner* — Mohammed N Huda
(74) *Attorney, Agent, or Firm* — Shook, Hardy & Bacon L.L.P.

(57) ABSTRACT

Methods, systems, and computer-readable media for deploying an updated image to nodes propagated throughout a distributed computing platform are provided. Upon receiving an indication to install a patch to an operating system residing on the nodes, an existing image of the operating system is accessed at a staging service. The staging service generates the updated image by applying the patch to the existing image. The process of applying the patch includes mounting the existing image of the operating system to a virtual machine, copying the patch to the mounted existing image, setting a command within the existing image that executes upon activating the virtual machine, and activating the virtual machine, thereby executing the command. This directs the patch to be installed. The updated image is pushed to the nodes. The nodes are configured to utilize the updated image as the operating system without performing an individual installation of the patch.

20 Claims, 5 Drawing Sheets

(51) Int. Cl.
*H04L 29/08* (2006.01)
*G06F 8/65* (2018.01)
*G06F 8/61* (2018.01)
*G06F 9/4401* (2018.01)

(58) Field of Classification Search
USPC .......................................................... 717/172
See application file for complete search history.

(56) References Cited

U.S. PATENT DOCUMENTS

| | | | |
|---|---|---|---|
| 7,356,679 B1 | 4/2008 | Le et al. | |
| 7,379,982 B2 | 5/2008 | Tabbara | |
| 2006/0075001 A1* | 4/2006 | Canning et al. | G06F 8/65 |
| 2006/0184937 A1* | 8/2006 | Abels et al. | G06F 8/65 718/1 |
| 2007/0234334 A1 | 10/2007 | Araujo et al. | |
| 2008/0082976 A1* | 4/2008 | Steinwagner et al. | G06F 8/63 718/1 |
| 2008/0163171 A1 | 7/2008 | Chess | |

OTHER PUBLICATIONS

Imaging and Desktop Engineering http://technet.microsoft.com/en-us/windows/aa940980.aspx.
Chris Wolf, Packaging Virtual Appliances for SMBs, Oct. 30, 2006, http://searchsystemschannel.techtarget.com/generic/0,295582,sid99_gci1226983,00.html.
Howto: Use Virtual PC's Differencing Disks to your Advantage http://www.andrewconnell.com/blog/articles/UseVirtualPCsDifferencingDisksToYourAdvantage.aspx.
Non-Final Office Action dated Jan. 4, 2012 in U.S. Appl. No. 12/360,686, 28 pages.
Final Office Action dated Feb. 4, 2013 in U.S. Appl. No. 12/360,686, 28 pages.
Non-Final Office Action dated Sep. 30, 2013 in U.S. Appl. No. 12/360,686, 36 pages.
Final Office Action dated Aug. 7, 2014 in U.S. Appl. No. 12/360,686, 38 pages.
Notice of Allowance dated Jul. 16, 2015 in U.S. Appl. No. 12/360,686, 13 pages.

* cited by examiner

CONSISTENT OPERATING SYSTEM SERVICING FOR DISTRIBUTED NODES

CROSS-REFERENCE TO RELATED APPLICATIONS

This application is a continuation of, and claims priority to, U.S. patent application Ser. No. 12/360,686, filed Jan. 27, 2009, entitled "CONSISTENT OPERATING SYSTEM SERVICING FOR DISTRIBUTED NODES," which is incorporated herein by reference in its entirety.

BACKGROUND

Large-scale networked systems are commonplace systems employed in a variety of settings for running applications and maintaining data for business and operational functions. For instance, a data center may provide a variety of services (e.g., web applications, email services, search engine services, etc.). These large-scale networked systems typically include a large number of nodes distributed throughout the datacenter, in which each node resembles a physical machine or a virtual machine running on a physical host. Due partly to the large number of the nodes that may be included within such large-scale systems, deployment of software (both operating systems (OSs) and applications) to the various nodes and maintenance of the software on each node can be a time-consuming and costly process.

Traditionally, software is installed and upgraded locally on each node in place such that installation and updates are specific to the individual nodes. Because the nodes will be installing the software upgrades individually, there is a likely chance of failure or variability upon performing the installation. Further, other specific operations, such as servicing or customization, may also be performed on the individual nodes. Potentially, these operations change the state of the operating system that is running on a computer node, and often the operations result in introducing indeterminism in the operating system state (as measured from node to node). Further, the operations applied specifically to each individual node may cause reliability and repeatability issues because the operation is repeated many times, thus, increasing the chance of failure.

Accordingly, when updating thousands of nodes, there is no guarantee that all of the nodes will be running software consistently or providing a similar operating system state. For instance, changes to a local software state (e.g., operating system configuration state) may occur due to human or software errors. Often, state changes cause the behavior of the node to become unpredictable. Also, there is no guarantee that each node will achieve a successful update.

By way of example, consider two machines receiving a servicing package that is being installed on each of the machines individually. Upon installing the package to the two different machines, there is no real guarantee that upon completion of the installation that both machines will reboot in exactly the same state. This is often caused by not knowing or accounting for a difference in the initial state of each machine, or numerous other factors that can make the machines distinct. Thus, it is indeterminate what the final state of the machines will be. Because there is no guarantee of consistency between the machines, a service application running thereon will execute unpredictably and provide various users of the service application an incongruent experience.

As such, the current solutions for installing software applications, which rely on curators of the data center to manually install the software applications individually, are ad hoc solutions, are labor-intensive, and are error-prone. Further, these current solutions do not guarantee a reliable result that is consistent across the data center. These shortcomings of manual involvement are exaggerated when the data center is expansive in size, comprising a multitude of interconnected hardware components that support the operation of a multitude of software applications.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to computer systems, computerized methods, and computer-readable media for deploying an updated image to one or more nodes propagated throughout a distributed computing platform. Initially, the nodes represent computing devices capable of running role instances of the service application within a distributed computing platform, where instances comprise replications of at least one role that resembles a component program for supporting particular functional aspects of the service application. In embodiments, the computerized method involves receiving an indication to install a patch to an operating system residing on the nodes of the data center. Typically, an existing image of the operating system is stored at a staging service. The staging service is capable of engaging a virtual machine to generate the updated image by applying the patch to the existing image. In one instance, generating the updated image includes separating the existing image into a variant state and an invariant state of the operating system, performing an installation of the patch on the variant state, and recombining the variant state and the invariant state to form the updated image.

In another instance, generating the updated image involves executing an application process. The application process is conducted by performing one or more of the following steps: mounting in the virtual machine the existing image of the operating system; copying the patch to the mounted existing image; setting a command within the existing image that executes upon activating the virtual machine; activating the virtual machine such that the command to execute is invoked, which directs the patch to be installed; capturing a snapshot of the existing image with the patch installed; saving the snapshot as the updated image; and utilizing the updated image for upgrading the operating system of the nodes upon receiving a subsequent indication to install a patch. Upon generating the updated image, it may be pushed to the nodes of the data center. In one instance, the process of pushing involves removing the nodes to an offline condition, loading the updated image to the offline nodes, and booting the offline nodes such that the nodes do not attempt to reinstall the operating system carried in the updated image. As a result, the one or more nodes can utilize the updated image as the operating system without performing an installation of the updated image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein.

DETAILED DESCRIPTION

Figure 1:
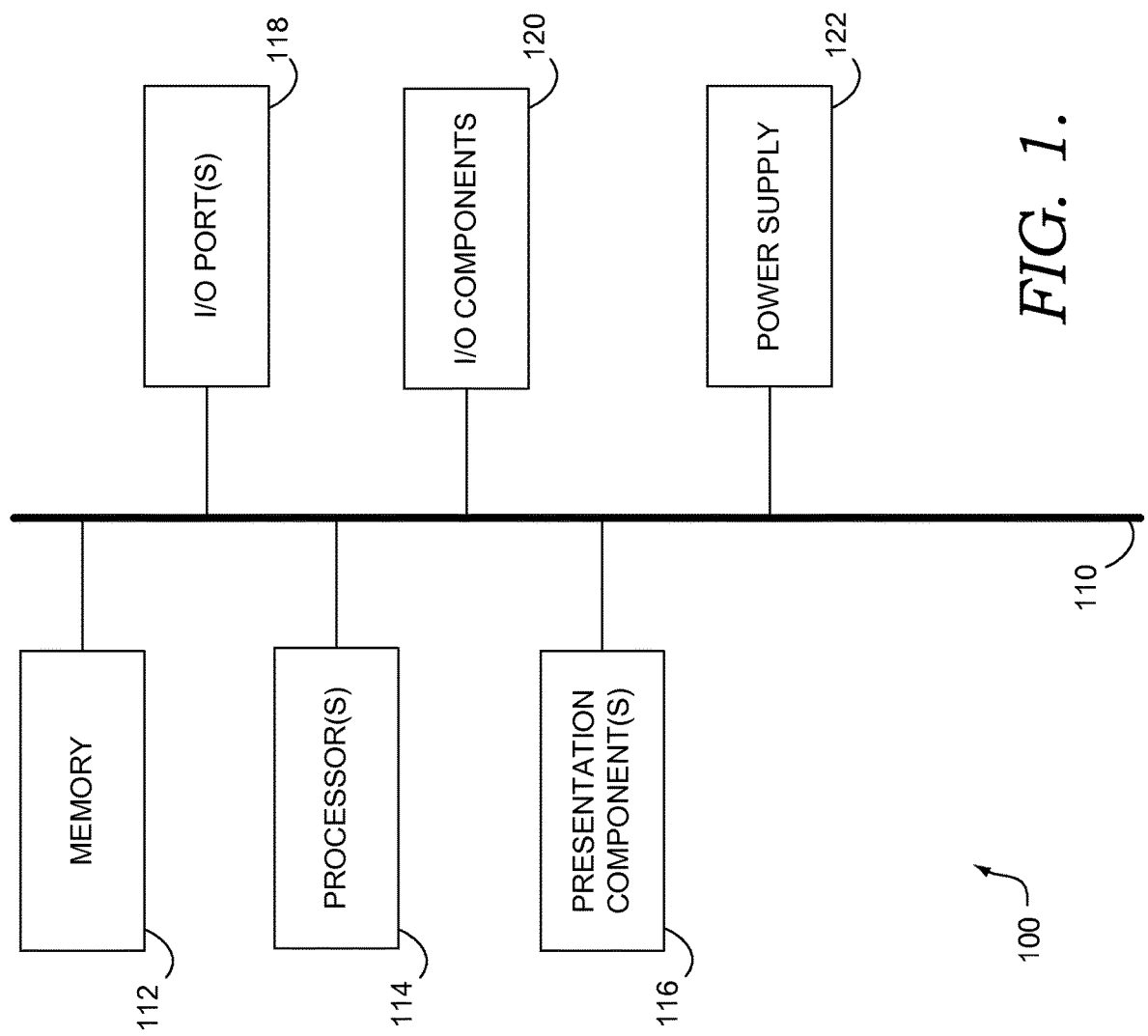
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer-storage media having computer-executable instructions embodied thereon that, when executed, perform methods in accordance with embodiments hereof, for updating an operating system of a plurality of nodes (e.g., computing devices) within the context of a distributed computing environment. Generally, a staging service is responsible for capturing an existing image of the operating system being executed on the plurality of nodes. Upon receiving a patch, the staging service is configured to employ a virtual machine to copy the patch to the existing image and reboot, thereby installing the patch to the existing image. The staging service may also separate a variant state and an invariant state of the existing image, process the states separately (e.g., perform individual software modifications to each of the states), and recombine the states to form an updated image. This updated image is configured to function as a new operating system upon simply being stored to the nodes—without conducting a second installation of the patch locally at each node. Accordingly, because the installation of the patch is remote and does not take into account the varied computing environments inherent to each of the nodes, the new operating system is consistent and determinant across the nodes.

Accordingly, in one aspect, embodiments of the present invention relate to one or more computer-readable media that has computer-executable instructions embodied thereon that, when executed, perform a method for deploying an updated image to one or more nodes propagated throughout a distributed computing platform. In embodiments, the method includes receiving an indication to install a patch to an operating system residing on the nodes of a data center. Typically, the existing image of the operating system is stored at a staging service. The method further includes generating the updated image by applying the patch to the existing image at a virtual machine. The process of generating the updated image may comprise, at least, the following steps: separating the existing image into a variant state and an invariant state of the operating system; performing an installation of the patch on the variant state and/or the invariant state; and recombining the variant state and the invariant state to form the updated image. This updated image is replicated and pushed to the nodes of the data center. Incident to loading the updated image of a new operating system, the nodes are configured to utilize the new operating system without performing an individual second installation of the patch.

In another aspect, embodiments of the present invention relate to a computerized method for upgrading an operating system on a computing device without installing a patch at the computing device. Initially, the computing device provides the operating system. An existing image of the operating system is stored at a remotely located staging service. In embodiments, the operating system is composed of at least one differencing disk that overlays a virtual disk. In operation, a service application supported by the operating system is allowed to write data to the differencing disk and is prevented from writing to the virtual disk. The computing device is configured to execute the computerized method that includes following instructions to enter an offline condition and downloading an updated image of a new operating system.

Downloading the updated image may include receiving the updated image comprising an updated virtual disk and storing the updated virtual disk such that the new operating system is ready to use upon booting the hard drive. As discussed more fully below, the updated virtual image includes an updated virtual disk and at least one empty differencing disk that is cleared of externally-written data. Typically, the updated image is generated by installing a patch to the existing image at the staging service. The computerized method may further involve the steps of following instructions to enter an online condition by booting a hard drive of the computing device and utilizing the new operating system without performing an installation of the patch.

In a third aspect, an exemplary computer system is provided for performing a method that deploys a patch to one or more nodes of a data center upon performing a single installation at a virtual computer. In embodiments, the computer system includes a processing unit coupled to a computer storage medium that stores a plurality of computer software components executable by the processing unit. Initially, the computer software components include a fabric controller, a staging service, a virtual machine, and the nodes. The fabric controller is configured for making a determination to roll out the patch to the operating system and communicating the indication to install the patch. Incident to receiving the indication to install the patch, the staging service conveys to the virtual machine an existing image of an operating system stored on each of the nodes. The virtual machine that executes an application process for generating an updated image by performing an installation of the patch on the existing image, and for iteratively propagating the updated image to the nodes. The nodes are configured for replacing the operating system with the updated image of a new operating system without performing an installation of the updated image.

Embodiments, of the present invention relate to deploying an upgrade to operating systems accommodated by nodes that are propagated throughout a distributed computing environment, or data center. In one instance, the nodes represent computing devices capable of running role instances of the service application within a distributed computing platform. As used herein, the term "roles" or role instances is not meant to be limiting, but may include any replication of at least one role, which generally resembles a component program that supports particular functional aspects of a service application.

As such, "roles" provide a template description of a functional portion of the service application. Roles are described by indicating the computer code implementing the role, the conditions within the hosting environment that are required by the role, configuration settings to be applied to the role, and the role's set of endpoints for communication with other roles, elements, etc. In one instance, the role's configuration settings may include collective settings which are shared by all instances of the role, or individual settings that are particular to each instance of the role. In an exemplary embodiment, the roles each represent a particular class of component of the service application. Typically, the service model delineates how many instances of each of the one or more roles to place within the data center, where each of the instances is a replication of the particular class of component, or role. In other words, each role represents a collection of instances of each class of components, where the service application may have any number of classes of components for carrying out functions thereof.

Having briefly described an overview of embodiments of the present invention, an exemplary operating environment suitable for implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including hand-held devices, consumer electronics, general-purpose computers, specialty computing devices, etc. Embodiments of the invention may also be practiced in distributed computing platforms where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
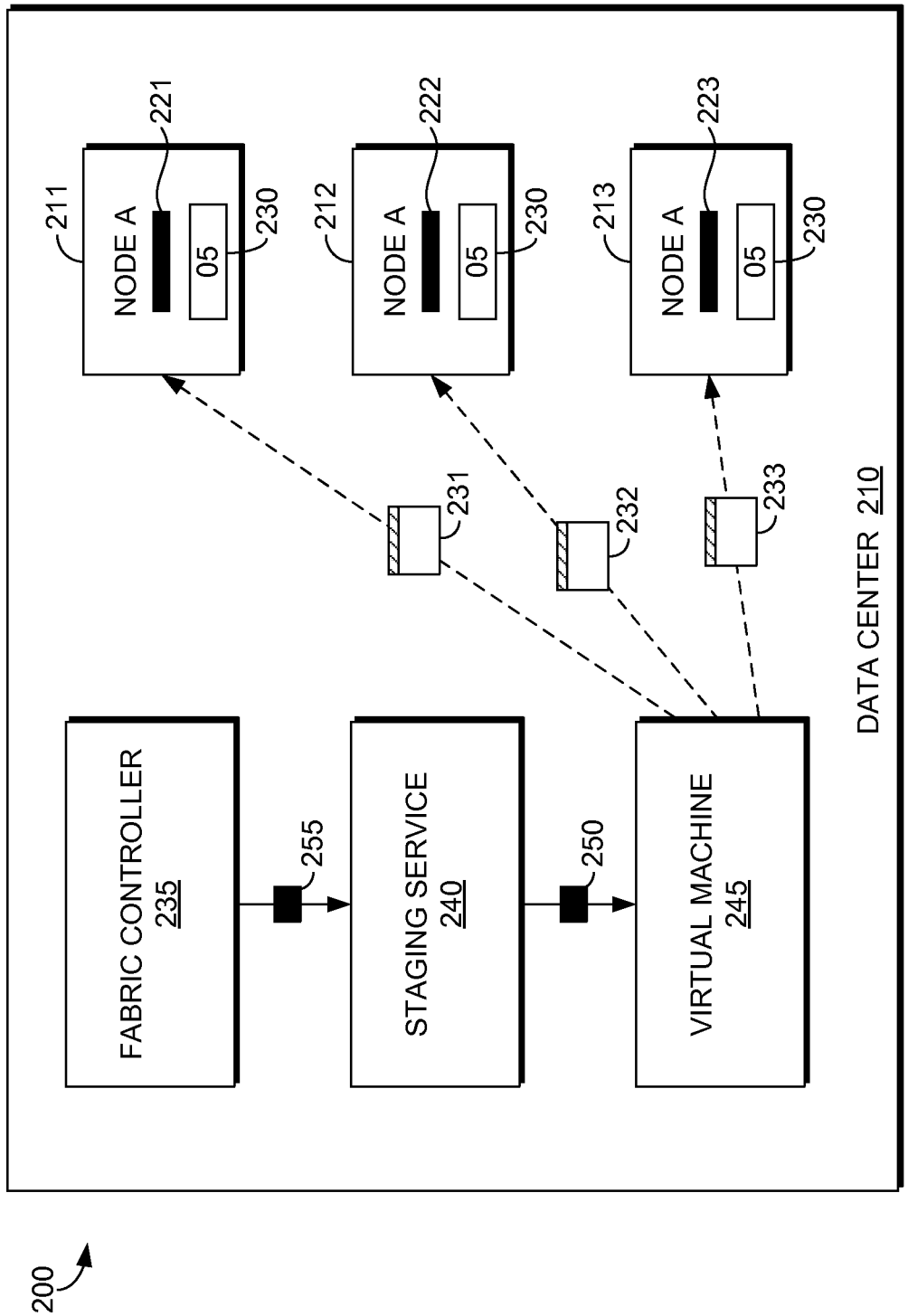
FIG. 2 is a block diagram illustrating a distributed computing environment, suitable for use in implementing embodiments of the present invention, that is configured to remotely install a patch to an existing image and deploy an updated image to targeted nodes.

Turning now to FIG. 2, a block diagram is illustrated showing a distributed computing environment 200, suitable for use in implementing embodiments of the present invention. Generally, the distributed computing environment 200 is configured to generate updated images 231, 232, and 233 and deploy them to nodes of a data center 210. The distributed computing environment 200 includes the data center 210 configured to accommodate and support operation of component programs, or instances of roles, of a particular service application according to the fabric controller 235. It will be understood and appreciated by those of ordinary skill in the art that the data center 210 shown in FIG. 2 is merely an example of one suitable for accommodating one or more service applications and is not intended to suggest any limitation as to the scope of use or functionality of embodiments of the present invention. Neither should the data center 210 be interpreted as having any dependency or requirement related to any single resource, combination of resources, combination of nodes (e.g., nodes A 211, B 212, and C 213), or set of APIs to access the resources and/or nodes. Further, although the various blocks of FIG. 2 are shown with lines for the sake of clarity, in reality, delineating various components is not so clear, and metaphorically, the lines would more accurately be grey and fuzzy.

Per embodiments of the present invention, the nodes A 211, B 212, and C 213 that execute the operating systems may be described within the context of a distributed computing environment 200 of a data center 210. The data center 210 includes various resources, such as a staging service 240, a virtual machine 245, and the nodes A 211, B 212, and C 213, that are interconnected. In addition, the role instance(s) (not shown) that reside on the nodes A 211, B 212, and C 213, and support operation of service applications, may be interconnected via application programming interfaces (APIs). In one instance, one or more of these interconnections may be established via a network cloud (not shown). These resources, as described herein, may include software components (e.g., fabric controller 235) as well as tangible computing elements, such as nodes A 211, B 212, and C 213. The network cloud interconnects these resources such that the role instances of service applications, which may be distributably placed across various physical resources, may recognize a location of other instances in order to establish communication therebetween. In addition, the network cloud facilitates this communication over channels connecting the instances of the service application and any other elements. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

Generally, the data center 210 provides underlying support for operation of the service application(s) within the distributed computing environment 200. In particular, the nodes A 211, B 212, and C 213 may accommodate a plurality of component programs, or the role instances of the service application, running independently on separate operating systems installed on one or more of the nodes A 211, B 212, and C 213. As described supra, the term "node" is not meant to be limiting and may encompass any computing device capable of executing the role instances in support of the service application. Moreover, the nodes A 211, B 212, and C 213 may represent any form of computing devices, such as, for example, a personal computer, a desktop computer, a laptop computer, a handheld device, a mobile handset, consumer electronic device, and the like. In one aspect, the nodes A 211, B 212, and C 213 represent a computing device of a plurality of distributed computing devices interconnected via the network cloud. Generally, these distributed computing devices are capable of executing a plurality of instances of various roles of the service application. In one instance, a particular node may be capable of accommodating two or more role instance(s). These role instances may run on the nodes A 211, B 212, and C 213 in complete isolation, in partial communication with instances of other roles, or in an interactive state with one or more other roles of the service application.

Typically, each of the nodes A 211, B 212, and C 213 include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes A 211, B 212, and C 213 to enable each device to perform a variety of processes and operations. In another instance, the computing unit may encompass a processor (not shown) coupled to the computer-readable medium accommodated by each of the nodes A 211, B 212, and C 213. Generally, the computer-readable medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the nodes A 211, B 212, and C 213. Generally, resources refer to software and hardware mechanisms that enable the nodes A 211, B 212, and C 213 to perform a particular function.

With continued reference to FIG. 2, the staging service 240 may be installed to a node of the data center 210, or to various nodes propagated throughout a distributed computing platform 200. Initially, the staging service 240 may be a software application that generates an update to an existing image of an operating system accommodated on one or more of the nodes A 211, B 212, and C 213. As used herein, the term "image" is not meant to be limiting, but may encompass any data or information that is related to an operating system residing at a remote machine. In one instance, an image is a representation of both a variant state and invariant state of an operating system. In another instance, the term image refers to all the bits that are required to run the operating system, thus, exposing the state of the operating system. Accordingly, the "existing image" may refer to a snapshot that captures various characteristic of the latest operating system deployed throughout the data center 210. As such, the existing image is substantially a pristine copy the current operating system within no external data written thereto.

In embodiments, the staging service 240 is invoked to update an existing image. Updating the existing image and subsequently deploying it allows the distributed computing environment 200 to generate, modify, and capture the variant state and the invariant state remotely, without the need to act directly on the target nodes intended to receive an update. Invoking the staging service 240 to update the existing image may result from a variety of triggers. For instance, the trigger to generate the updated image may be a timer mechanism that sends a signal at the expiration of a determined interval (e.g., four months), a real-time response to detecting a new patch to be installed, or at the request of another component. By way of example, the fabric controller 235 may make a determination to roll out a patch to the operating system and communicate an indication 255 to install the patch to the staging service.

Upon being instructed to generate the updated image, the staging service 240 may carry out these instructions by implementing various procedures. In one instance, generating the updated image may include engaging the virtual machine 245 that can install a patch to an image in isolation without placing an active node in an offline condition. As used herein, the phrase "virtual machine" is not meant to be limiting, and may refer to any software, application, or program that is executed by a processing unit to achieve a particular directive. Upon engaging the virtual machine 245, the staging service 240 may transfer the existing image 250, and any other information pertinent to an update, to the virtual machine 250. Incident to receiving the existing image 250, the virtual machine 245 may execute an application process for generating an updated image. One goal of the application process is to perform an installation of a patch on the existing image 250, and iteratively propagate the updated image to the A 211, B 212, and C 213. In instances, installing the patch to the existing image 250 at a virtual machine 245 includes targeting one or more of the nodes 211 A, 212 B, and 213 C, selecting differencing disks based upon attributes of the nodes 211 A, 212 B, and 213 C that are targeted for receiving the patch, combining the selected differencing disk with a virtual disk upon installing the patch thereto, and directing the resultant updated images 231, 232, and 233 to the appropriate targeted nodes 211 A, 212 B, and 213 C, respectively. Once the nodes 211 A, 212 B, and 213 C receive the respective updated images 231, 232, and 233 that are targeted thereto, each of the nodes 211 A, 212 B, and 213 C replace their operating systems with the updated image 231, 232, and 233 of a new operating system without performing an installation of the applied patch. Accordingly, the nodes 211 A, 212 B, and 213 C may utilize the new operating system to support operations of the role instances assigned thereto.

In a particular embodiment, each of the nodes 211 A, 212 B, and 213 C may have an operating system running thereon that is replaced by the updated image of the new operating system. The operating systems to be retired may comprise an invariant state (i.e., portion of the operating system that does not change) and an variant state (e.g., portion of the operating system that is affected by roles instances and other applications running on the operating system). In one instance, the variant state includes a registry to which applications write data and use as a temporary memory, or cache. Accordingly, the invariant states 221, 222, and 223 of the nodes 211 A, 212 B, and 213 C, respectively, may vary in content or state. Because the invariant states 230 of the operating systems loaded to the nodes 211 A, 212 B, and 213 C disallow data being written thereto, the invariant states 230 are common to each of the nodes of the data center 210.

Returning to the process of generating an updated image, the virtual machine 245 is instructed to apply the patch to the existing image 250. In other embodiments, the virtual machine 245 automatically applies the patch upon accepting the existing image 250. Applying the patch may include mounting the existing image 250 (e.g., a pristine representation of the current operating system) copy the patch into it, and set a command in the existing image that instructs the virtual machine 245, upon reboot, to finish running the patch. That is, when the virtual machine 245 is booted, the patch finishes running (installing itself).

Upon installing the patch, the virtual machine 245 may be used to test the functionality of the updated image. Implementing testing is useful to ensure that the installed patch is functioning according to specification. Upon reaching satisfaction that the updated image is functioning properly, the virtual machine 245 is shut down and the updated image is saved, thereby replacing the existing image 250. Saving the updated image may include several steps, such as capturing a snapshot of the existing image 250 with the patch installed, and saving the snapshot as the updated image. In the future, the updated image may be utilized for upgrading the new operating system of the nodes 211 A, 212 B, and 213 C upon receiving a subsequent indication to install a patch.

In other embodiments of the process of generating the updated image, the existing image 250 of the current operating system may be divided into a variant state and an invariant state of the operating system. These states may be encapsulated as artifacts, where the artifacts comprise a virtual disk (for maintaining the invariant state) and at least one differencing disk (for maintaining aspects of the variant state). In embodiments, the artifacts may comprise a plurality of differencing disks that each maintain a portion of the variant state, where each can be stacked on top of each other and on the virtual disk to build the complete operating system. In embodiments, the virtual disk represents a pristine model of the operating system that is common to each of the targeted nodes.

Upon dividing the operating system into the virtual disk and the differencing disks, an installation of the patch may be performed on the invariant state of the virtual disk and/or the variant state of the differencing disk. Upon completing the installation(s), and optionally the testing, the variant state and the invariant state are recombined to form the updated image. In one instance, the generated variant state is then stored in the staging service 240 ready to be deployed together with the invariant state to the appropriate nodes.

As used herein, the term "artifacts" is not meant to be limiting, but may encompass any representative model of a section, attribute, or set of values of an operating system. Accordingly, artifacts are not limited to simply a virtual disk and one or more differencing disks. Further, artifacts may be created upon capturing an image of an operating system or may be dynamically generated during the processing of the image. Further, upon generating the updated image, the updated image may be stored in an artifact referred to as a base virtual hard drive (VHD). The base VHD is generally a file that looks like a hard drive. In other embodiments, just the common pristine model, or virtual disk, is stored to the base VHD. In operation, the base VHD may be deployed to the nodes 211 A, 212 B, and 213 C to install the operating system, or may be retained in the staging service for 240 in order to maintain a clean copy of the latest operating system deployed.

Upon generating the updated image (e.g, updated images 231, 232, and 233), the updated images are replicated and each replication is distributed and loaded to the nodes 211 A, 212 B, and 213 C, respectively. In embodiments, during loading, the virtual disk of the updated image replaces the invariant state 230 of the operating systems residing at the nodes 211 A, 212 B, and 213 C, while the differencing disk of the updated image replaces the variant states 221, 222, and 223 of the operating systems residing at the nodes 211 A, 212 B, and 213 C, respectively. Accordingly, the data written to the variant states 221, 222, and 223 is lost and the operating system are provided one or more stacked differencing disks that include clean variant states. As such, the updated images of the new operating system (e.g., fully transformed replications of an operating system with an installed patch), upon loading, are consistent across the nodes 211 A, 212 B, and 213 C because they are not subject to variations caused by internal inconsistencies of the nodes 211 A, 212 B, and 213 C.

In embodiments, deployment comprises pushing, or propagating, the updated image to the nodes 211 A, 212 B, and 213 C based on a persistence algorithm. Generally, the persistence algorithm selects an order and timing for removing the nodes 211 A, 212 B, and 213 C to an offline condition to ensure that active redundant nodes are available for supporting the particular functional aspects of the service application that are supported by nodes in the data center 210. From the perspective of the nodes 211 A, 212 B, and 213 C, deployment involves following instructions to enter an offline condition, downloading the updated image of the new operating system, and following instructions to enter an online condition by booting a hard drive of the computing device. Accordingly, the nodes 211 A, 212 B, and 213 C are configured to utilize the new operating system without performing an installation of the patch. Further, in embodiments, the nodes 211 A, 212 B, and 213 C are able to retain the common virtual disk as part of the operating system as the hardware therein is configured with a common set of values that allow them to run a single base VHD.

This distributed computing environment 200 is but one example of a suitable environment that may be implemented to carry out aspects of the present invention, and is not intended to suggest any limitation as to the scope of use or functionality of the invention. Neither should the illustrated exemplary system architecture of the distributed computing system 200 be interpreted as having any dependency or requirement relating to any one or combination of the components 235, 240, and 245 as illustrated. In some embodiments, one or more of the components 235, 240, and 245 may be implemented as stand-alone devices. In other embodiments, one or more of the components 235, 240, and 245 may be integrated directly into the nodes. It will be understood by those of ordinary skill in the art that the components 235, 240, and 245 illustrated in FIG. 2 are exemplary in nature and in number and should not be construed as limiting.

Figure 3:
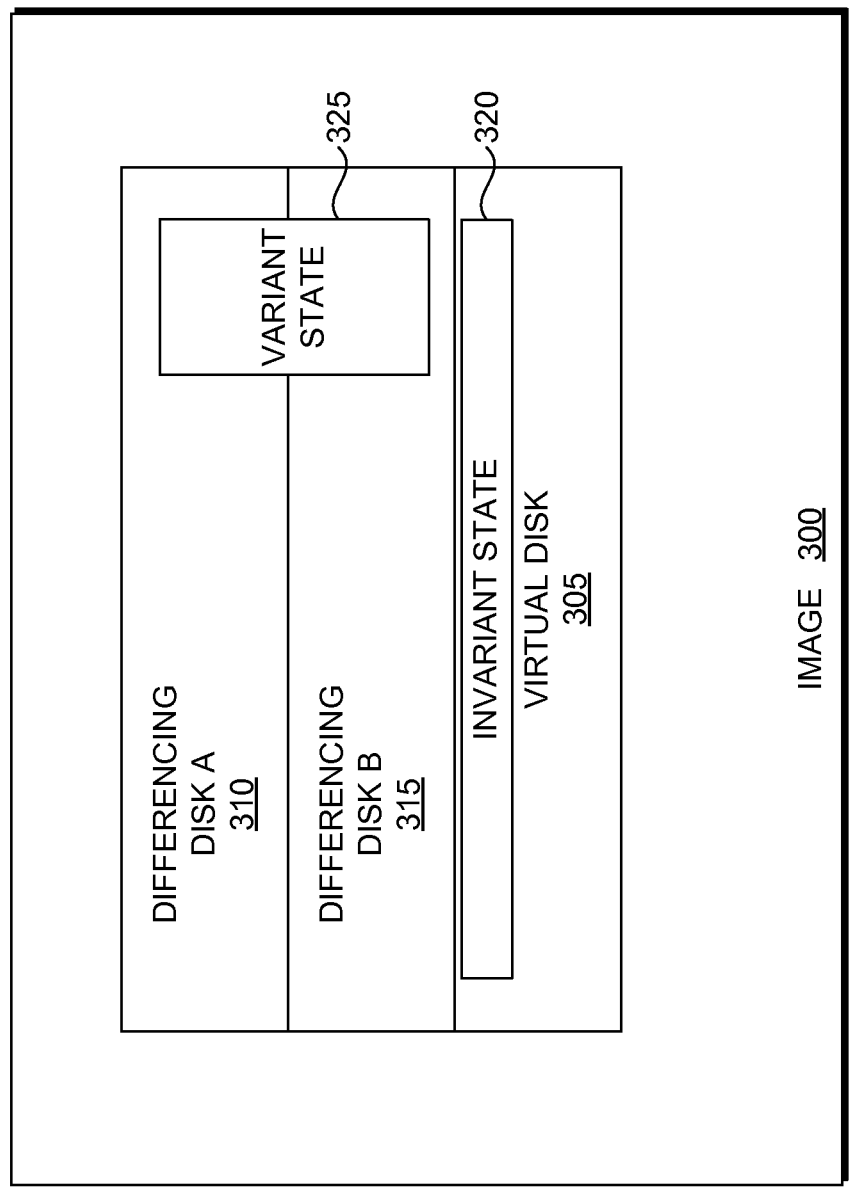
FIG. 3 is a graphical representation of an exemplary image of an operating system that is separated into multiple states, in accordance with an embodiment of the present invention.

With reference to FIG. 3, a graphical representation is shown of an exemplary image 300 of an operating system that is separated into multiple states, in accordance with an embodiment of the present invention. As illustrate, the differencing disk A 310 and differencing disk B 315 are stacked and each maintains a portion of the variant state 325 of an operating system. These differencing disks A 310 and B 315 may overlay the virtual disk 305 that maintains the invariant state 320 of the operating system. During operation, the variant state 325 accumulates data and other modifications thereto. Accordingly, upon replacing the differencing disks A 310 and B 315 with the differencing disks of the updated image (e.g., by erasing the overlay) the invariant state 325 is removed and a pristine image is restored. That is, upon applying the updated image, the overlay is not reinstalled, but thrown away. Generally, the invariant state is not modified. This may be due to an application model that ensures that the state of the role instances are maintained outside the invariant state 320. As such, the application model ensures that anything the application chooses to write is used for temporary memory and can be recreated by the application if access is denied to a cache.

In embodiments, the differencing disks A 310 and B 315 are linked to the underlying virtual disk 305 and provide a composite view of the contents of both to applications running thereon. Accordingly, adding, subtracting, or replacing the differencing disks A 310 and B 315 allows the staging service to represent unique customized physical installations of the operating system. By way of example, the differencing disk A 310 may be an internet information service (IIS) element that is combined with the virtual disk 305 to create a specialized version of an operating system with IIS incorporated. The differencing disk B 310 may be another windows-optional component that provides an interface with the running application. Accordingly, the application's view comprises the three disks 305, 310, and 315 stacked on top of each other. Thus, each differencing disk can have a small amount of customization to create the unique operating system environment that is adaptable to support a variety of applications and loads. As such, in instances, customization is directed toward different services or applications.

Some examples of the variant state 325 that gets generated and stored in the differencing disks include the secrets from joining a domain. When a computer joins a domain, it exchanges secret keys with the domain. These keys are stored and accessed upon attempting to communicate with the domain so that the machine is recognized. Because the key is now known to the data center, it may be sent to each node that is reached during deployment of the updated image. That is, the data center can leverage the collection of a key at one node and distribute the key to any other nodes that are designated to talk with the domain, thereby avoiding repeating the initial action of joining a domain. In another example, the variant state 325 includes a unique machine identifier that is sent individually to the nodes. In yet another example, the variant state 325 comprises custom configuration data generated when operating system roles are installed, removed, etc.

Although three different configurations of the variant state 325 have been described, it should be understood and appreciated by those of ordinary skill in the art that other types of suitable configurations and content may be used, and that embodiments of the present invention are not limited to those variant-state-models described herein.

Figure 4:
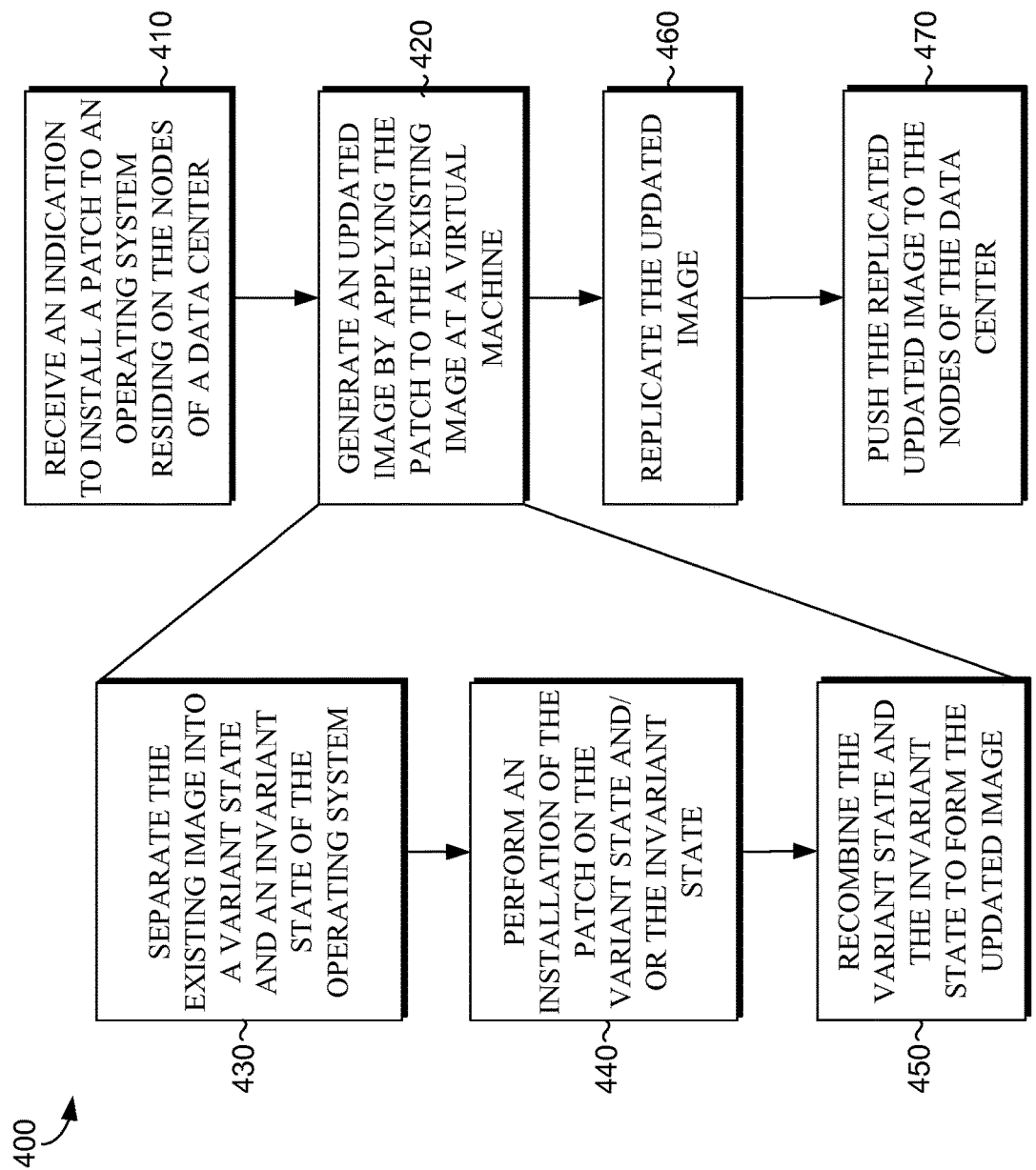
FIG. 4 is a flow diagram showing an overall method for deploying an updated image to one or more nodes propagated throughout a distributed computing platform, in accordance with an embodiment of the present invention.

Turning now to FIG. 4, a flow diagram is shown that illustrates an overall method 400 for deploying an updated image to one or more nodes propagated throughout a distributed computing platform, in accordance with an embodiment of the present invention. Accordingly, in one aspect, the method 400 includes receiving an indication to install a patch to an operating system residing on the nodes of a data center (e.g. utilizing the staging service 240 of FIG. 2). This is depicted at block 410. Typically, the existing image of the operating system is stored at the staging service. As depicted at block 420, the method 400 further includes generating the updated image by applying the patch to the existing image at a virtual machine (e.g., utilizing the virtual machine 245 of FIG. 2). The process of generating the updated image may comprise, at least, the following steps: separating the existing image into a variant state and an invariant state of the operating system (see block 430); performing an installation of the patch on the variant state and/or the invariant state (see block 440); and recombining the variant state and the invariant state to form the updated image (see block 450). This updated image is replicated and pushed to the nodes of the data center, as depicted at block 460 and 470. Incident to loading the updated image of a new operating system, the nodes are generally configured to utilize the new operating system without performing an individual second installation of the patch.

Figure 5:
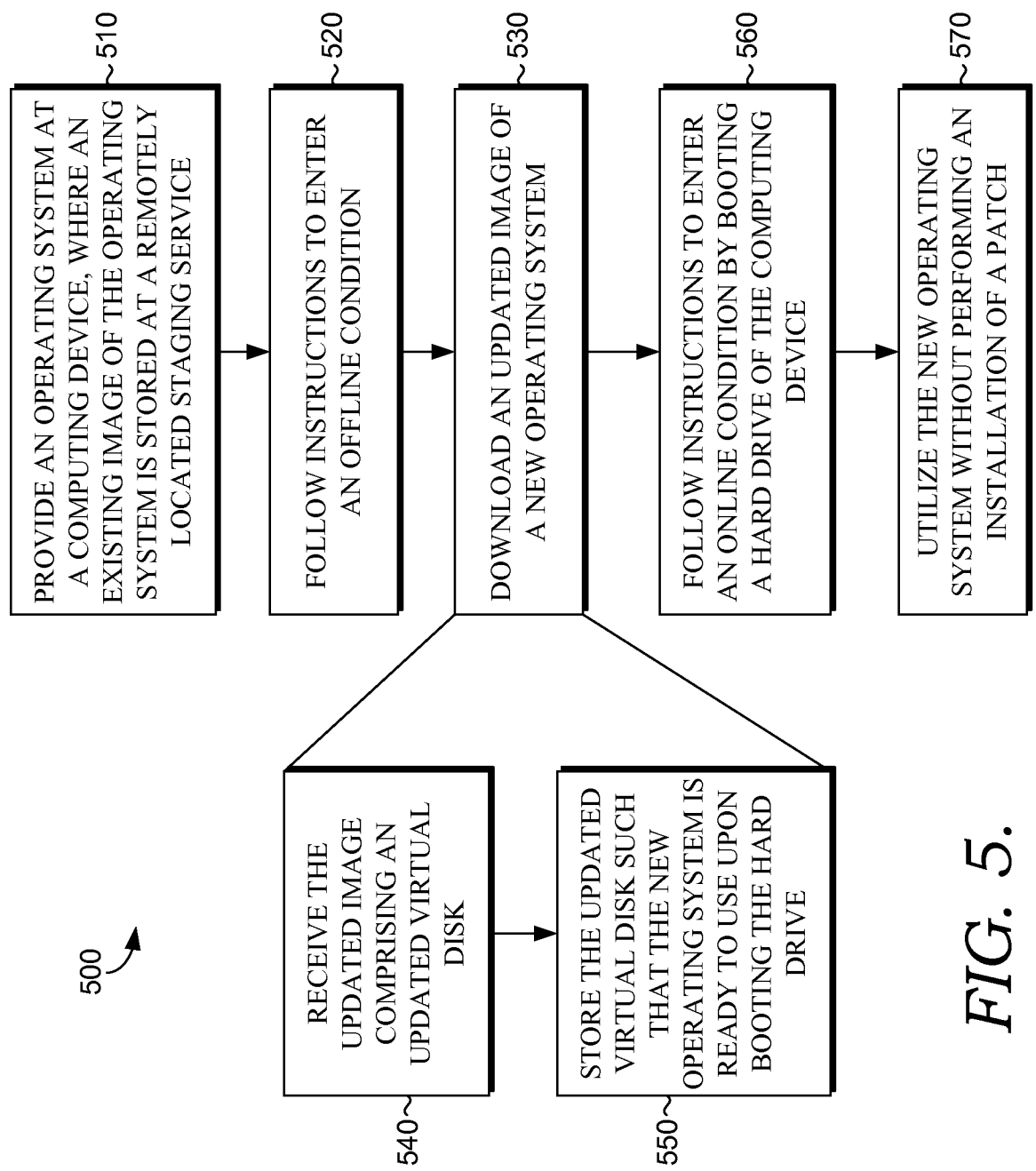
FIG. 5 is a flow diagram showing an overall method for upgrading an operating system on a computing device without installing a patch at a computing device, in accordance with an embodiment of the present invention.

With reference to FIG. 5, a flow diagram is shown that illustrates an overall method 500 for upgrading an operating system on a computing device without installing a patch at a computing device, in accordance with an embodiment of the present invention. Initially, the computing device provides the operating system, as depicted at block 510. An existing image of the operating system is stored at a remotely located staging service. In embodiments, the operating system is composed of at least one differencing disk that overlays a virtual disk. In operation, a service application supported by the operating system is allowed to write data to the differencing disk and is prevented from writing to the virtual disk. The computing device (e.g., node A 211, B, 212, or C 213 of FIG. 2) is configured to execute the computerized method that includes following instructions to enter an offline condition (see block 520) and downloading an updated image of a new operating system (see block 530).

Downloading the updated image may include receiving the updated image comprising an updated virtual disk (see block 540) and storing the updated virtual disk such that the new operating system is ready to use upon booting the hard drive (see block 550). As discussed more fully below, the updated virtual image includes an updated virtual disk and at least one empty differencing disk that is cleared of externally-written data. Typically, the updated image is generated by the installing a patch to the existing image at the staging service. The computerized method may further involve the steps of following instructions to enter an online condition by booting a hard drive of the computing device (see block 560) and utilizing the new operating system without performing an installation of the patch (see block 570).

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computer system to deploy updated images to distributed nodes in data centers, the system comprising:
a staging service configured to:
initialize a virtual machine to update an existing image of an operating system using a patch, wherein the existing image is stored at the staging service as an image that corresponds to a deployed image on the nodes in a data center, the existing image having a variant state and an invariant state of the operating system;
the virtual machine configured to:
generate an updated image of the existing image that corresponds to the deployed image on the nodes, wherein the patch is installed on the variant state to generate the updated image at the virtual machine; and
provide the updated image having the patch pre-installed, the updated image is provided to cause targeting nodes running the deployed image of the existing image used to generate the updated image;
and
one or more nodes configured to:
receive the updated image, wherein the updated image is received at the one or more nodes running the deployed image that corresponds to the updated image generated based on the existing image and virtual machine associated with the staging service; and
boot to the updated image without performing an installation of the updated image on the one or more nodes.

2. The computer system of claim 1, further comprising a fabric controller configured to make a determination to roll out the patch to the operating system and communicate an indication to staging service to generate the updated image, wherein generating the updated patch comprises:
separating, at the virtual machine of the staging service, the existing image into the variant state and the invariant state, to process the states separately;
performing, at the virtual machine of the staging service, an installation of the patch on the variant state; and
recombining, at the virtual machine of the staging service, the variant state and the invariant state to form the updated image, wherein the updated image functions as a new operating system of a node based on the node booting up to the update image without installation of the updated image.

3. The computer system of claim 1, wherein the virtual machine supports the existing image having a virtual disk linked to a differencing disk, the virtual disk comprises the invariant state of the operating system and the differencing disk stores the variant state of the operating system, wherein the virtual disk and the differencing disk are configured such that a service application supported by the operating system writes data to the differencing disk and does not write data to the virtual disk.

4. The computer system of claim 1, wherein generating the updated image at the virtual machine further comprises:
mounting the existing image on the virtual machine, wherein the existing image is a pristine model of the operating system that excludes data written to the operating system when running on the one or more nodes;
copying the patch to the mounted existing image;
setting a command within the existing image that executes upon activating the virtual machine;
activating the virtual machine to cause the command to execute to be invoked, wherein, during execution, the command instructs the existing image to install the patch;
capturing a snapshot of the existing image with the patch installed;
saving the snapshot as the updated image; and
utilizing the updated image for upgrading the operating system of the one or more nodes.

5. The computer system of claim 1, wherein the one or more nodes are further configured to:
initiate an offline condition;
download the updated image; and
boot to run an operating system of the updated image without reinstalling the operating system of the updated image.

6. The computer system of claim 5, wherein downloading the updated image further comprises the one or more nodes configured to:
receive the updated image comprising an updated virtual disk and a differencing disk that is empty and cleared of externally-written data;
store the updated virtual disk such that a new operating system is ready to be used upon booting; and
replace a differencing disk on the one or more nodes with the differencing disk of the updated image.

7. A computer-implemented method for upgrading operating systems of computing devices, without installing patches on the computing devices, the method comprising:
downloading an updated image of an existing image of operating system having a variant state and an invariant state, the updated image having a patch pre-installed using a staging service, the updated image is downloaded to cause retiring of a deployed image that corresponds to the existing image used to generate the updated image;

wherein the staging service initializes a virtual machine to generate the updated image with the patch that is installed on the operating system at the virtual machine of the staging service;

wherein the virtual machine supports the existing image having a virtual disk and a differencing disk, the virtual disk comprises the invariant state of the operating system and the differencing disk stores the variant state of the operating system, wherein the virtual disk and the differencing disk are configured to cause a service application supported by the operating system to write data to the differencing disk and not write to the virtual disk;

booting to the operating system of the update image; and utilizing the operating system of the updated image without performing an installation of the patch.

8. The computer-implemented method of claim 7, wherein generating the updated image at the staging service comprises:

separating the existing image into the variant state and an invariant state;

performing an installation of the patch on the variant state; and recombining the variant state and the invariant state to form the updated image, wherein the updated image functions as a new operating system of a node based on the node booting up to the update image without installation of the updated image.

9. The computer-implemented method of claim 7, the method further comprising:

receiving the updated image comprising an updated virtual disk and a differencing disk that is empty and cleared of externally-written data;

storing the updated virtual disk such that a new operating system is ready to be used upon booting; and replacing a differencing disk on the one or more nodes with the differencing disk of the updated image.

10. The computer-implemented method of claim 7, wherein the updated image is propagated to be downloaded based on a persistence algorithm, wherein the persistence algorithm selects an order and timing for removing one or more nodes, that download updated images, to an offline condition to ensure that active redundant nodes are available for supporting the particular functional aspects of the service application that are supported by the one or more nodes.

11. One or more computer storage hardware memory having computer-executable instructions embodied thereon that, when executed, perform a method for deploying updated images to one or more nodes propagated throughout a distributed computing platform, the method comprising:

receiving an indication to install a patch to an existing image of an operating system residing on one or more nodes of a data center, wherein the existing image is stored at a staging service as an image that corresponds to a deployed image on the one or more nodes;

generating the updated image by applying the patch to the existing image at a virtual machine, wherein the updated image having the patch pre-installed is communicated to cause targeting the one or more nodes running the deployed image of the existing image used to generate the updated image, the virtual machine supports the existing image having a virtual disk and a differencing disk, the virtual disk comprising the invariant state of the operating system and the differencing disk stores the variant state of the operating system; and pushing the updated image, to the one or more nodes of a data center to cause booting to the updated image at the one or more nodes, wherein the one or more nodes are configured to utilize the updated image of the operating system without performing an installation of the updated image.

12. The one or more computer storage hardware memory of claim 11, wherein generating the updated image by applying the patch to the existing image at a virtual machine further comprises:

copying the patch to the mounted existing image; and setting a command within the existing image that executes upon activating the virtual machine.

13. The one or more computer storage hardware memory of claim 11, wherein generating the updated image by applying the patch to the existing image at a virtual machine further comprises activating the virtual machine to cause the command to execute to be invoked, wherein, during execution, the command instructs the existing image to install the patch.

14. The one or more computer storage hardware memory of claim 11, wherein generating the updated image by applying the patch to the existing image at a virtual machine further comprises:

capturing a snapshot of the existing image with the patch installed;

saving the snapshot as the updated image; and utilizing the updated image for upgrading the operating system of the one or more nodes.

15. The one or more computer storage hardware memory media of claim 11, wherein the method further comprises:

separating, at the virtual machine of the staging service, the existing image into a variant state and an invariant state of the operating system, the operating system having at least one differencing disk and a virtual disk, wherein the virtual disk is a pristine model of the operating system;

performing, at the virtual machine of the staging service, an installation of the patch on the variant state; and recombining, at the virtual machine of the staging service, the variant state and the invariant state to form the updated image, wherein the updated image functions as a new operating system of a node based on the node booting up to the update image.

16. The one or more computer storage hardware memory of claim 15, wherein the virtual disk is configured to accommodate the invariant state of the operating system that is common to each of the one or more nodes of the data center.

17. The one or more computer storage hardware memory of claim 15, wherein the at least one differencing disk is configured to accommodate the variant state of the operating system that is affected by the role instances of the service application running on the one or more nodes.

18. The one or more computer storage hardware memory of claim 15, wherein generating the updated image by applying the patch to the existing image at a virtual machine further comprises:

selecting at least one empty differencing disk based upon attributes of the one or more nodes that are targeted for receiving the updated image; and combining the at least one empty differencing disk with the virtual disk upon installing the patch thereto.

19. The one or more computer storage hardware memory of claim 18, wherein selecting at least one empty differencing disk based upon attributes of the one or more nodes that are targeted for receiving the updated image comprises:
- recognizing the role instances of the service application running on the one or more target nodes; and
- identifying the at least one empty differencing disk that adequately supports functionality of the one or more target node.

20. The one or more computer storage hardware memory of claim 18, wherein pushing the updated image to the one or more nodes of the data center comprises:
- removing the one or more nodes to an offline condition;
- loading the updated image to the one or more offline nodes; and
- booting the one or more offline nodes, wherein the process of booting does not reinstall the operating system carried in the updated image.

* * * * *